UNITED STATES PATENT OFFICE.

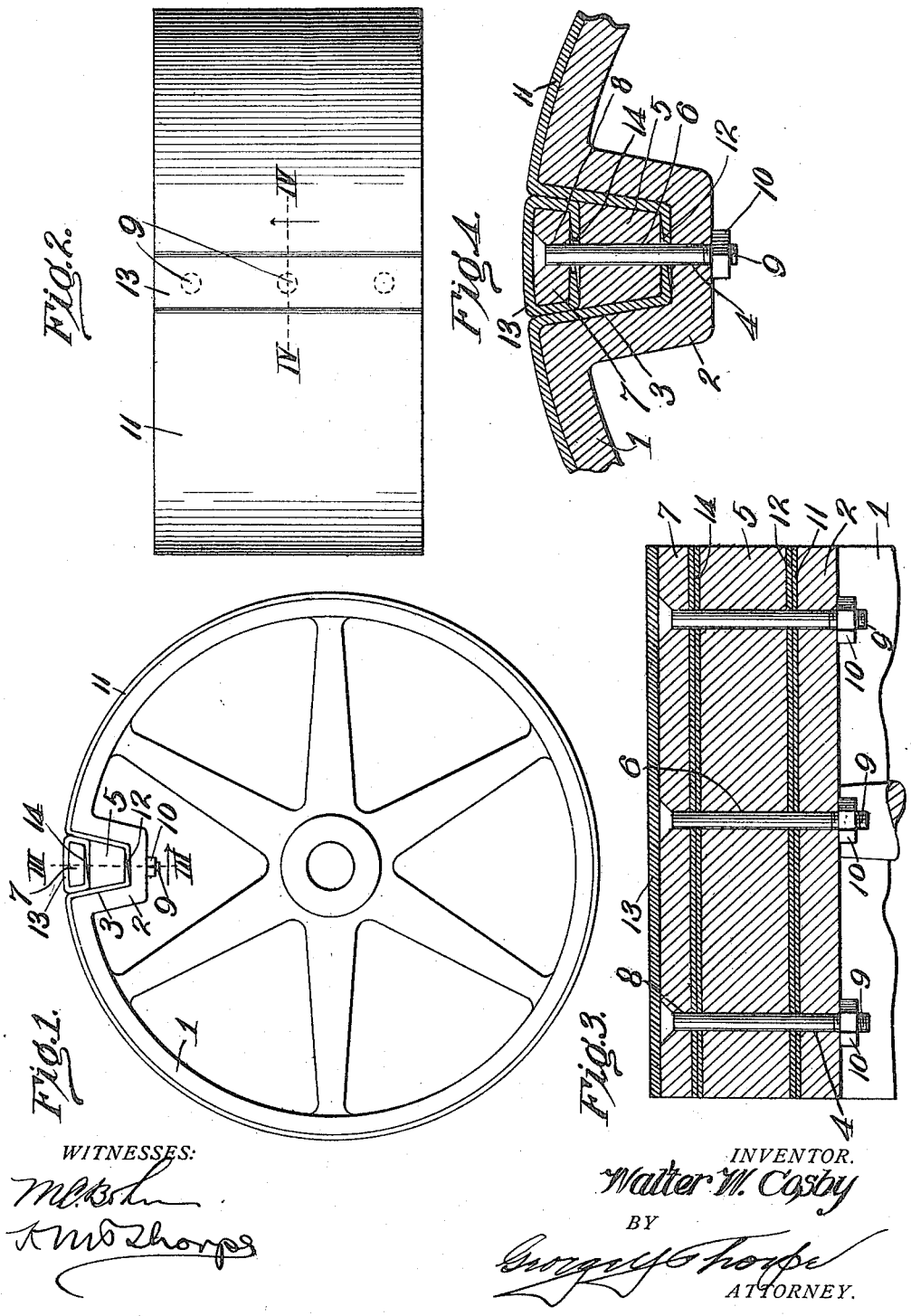

WALTER W. COSBY, OF BIRMINGHAM, MISSOURI.

LAGGING-FASTENER FOR PULLEYS.

1,221,792.      Specification of Letters Patent.      Patented Apr. 3, 1917.

Application filed October 2, 1916. Serial No. 123,438.

*To all whom it may concern:*

Be it known that I, WALTER W. COSBY, citizen of the United States, residing at Birmingham, in the county of Clay and State of Missouri, have invented certain new and useful Improvements in Lagging-Fasteners for Pulleys, of which the following is a specification.

This invention relates to lagging fasteners for pulleys, and has for its object to produce a simple, strong, durable and inexpensive means whereby lagging can be quickly, easily and efficiently secured upon a pulley to increase the driving traction thereof or the diameter of the pulley.

With this object in view the invention consists in certain novel and peculiar features of construction and organization of parts as hereinafter described and claimed, and in order that it may be fully understood, reference is to be had to the accompanying drawing, in which:

Figure 1, is a side view of the pulley equipped with a lagging fastener embodying my invention.

Fig. 2, is a plan view of the same.

Fig. 3, is an enlarged section taken on the line III—III of Fig. 1.

Fig. 4, is a section taken on the line IV—IV of Fig. 2, on the same scale as Fig. 3.

In the said drawing, 1 indicates a pulley of the type shown or of any suitable or preferred type, provided with a rib at the inner side of its rim or circumferential portion, said rib 2 preferably extending for the full width of the pulley and paralleling the axis thereof.

The pulley is provided with a transverse or cross groove 3 coincidental with and extending down into said rib for the full length thereof by preference, and the inner portion or bottom of the rib is provided with one or more radial bolt holes 4.

A tapered bar or wedge 5 corresponding in length to the groove in the rib, is adapted to fit loosely in the latter, and is provided with radial bolt holes 6 to register with the bolt holes 4 of the rib.

A clamping strip 7 of the same length as but narrower than the widest or outer face of the tapered or wedge bar 5, is provided with bolt holes 8 adapted to register with bolt holes 6, the outer ends of bolt holes 8 being flared to receive the heads of bolts 9, which extend through registering holes 8, 6 and 4, and when the bolts are fitted through the registering holes as explained, nuts 10 are screwed upon the inner ends of the bolts.

To secure a band of lagging 11 substantially upon the pulley, the ends of the lagging are fitted down into the groove 3 and overlapped at the bottom thereof, it being preferable that the overlapping extremities shall be tapered as at 12, so that they conjointly equal the thickness of the lagging.

When the lagging is fitted around the pulley as explained, the wedge bar 5 is inserted into the groove so as to clamp the overlapping extremities of the lagging upon the bottom of the rib and the inwardly extending portions of the lagging against the side walls of the groove.

The clamping strip 7 is then inclosed by a strip 13 of lagging, the latter preferably being bent around the strip and having its marginal portions overlapping at the underside of the strip, said overlapping portions being preferably tapered at 14 as before described with respect to the extremities of the lagging 11 and provided with notches or slots 14, to accommodate the bolts when the latter are assembled with respect to said strip.

If the lagging 11 has not been previously perforated in alinement with the bolt-holes, perforations are made therein, and after the lagging 13, is fitted around the strip 7, as shown, the strip thus covered is fitted in the groove with the bolts extending through the holes 8, 6 and 4. A nut 10 for each bolt is then screwed upon the inner end of the same, and turned with a wrench until the lagging 11 is clamped firmly in place, and the lagging 13 is clamped firmly between the wedge bar and the clamping strip, it being noticed in this connection that the width of the clamping strip is such that the lagging cover 13 where it extends around the edges of the strip, shall bear firmly and tightly against the lagging 11 outward of the wedge bar, and it will also be understood that the parts are so proportioned that the outer surface of the lagging 13 shall be flush with the outer surface of the lagging 11 so that the symmetry of the pulley shall be maintained, and the grip of the belt (not shown), engaging the pulley shall be uniform.

On a narrow pulley, a single bolt may be sufficient. Usually however, a plurality of bolts will be employed. In large pulleys it may be desirable to provide a plurality of grooved ribs and a corresponding number of sets of wedge blocks and clamp strips, a plurality being more especially desirable on pulleys of large diameter where the circumferential portion of the lagging is long and hence more likely to stretch and become loose.

From the above description it will be apparent that I have produced a lagging fastener for belt pulleys which embodies the features of advantage enumerated as desirable, and which is susceptible of modification in minor particulars without departing from the spirit and scope of the appended claims.

I claim:

1. The combination with a pulley having a transverse peripheral groove, lagging fitting around the pulley and against the walls of the groove, a wedge block fitting in the groove, a lagging-covered clamping strip fitting in the groove outward of the wedge block and against the portions of the lagging around the pulley which fit against the side walls of the groove, and means for causing the clamping strip to clamp the wedge block within the groove and the lagging around the pulley tightly upon the same.

2. The combination with a pulley, having a transverse peripheral groove, lagging fitting around the pulley and against the inner walls of the groove, a wedge block fitting in the groove, a bolt extending through the wedge block and the bottom wall of the groove in the pulley, and a retaining device engaging the inner end of the bolt and the inner side of the bottom wall of the groove to draw the bolt inward and hold it in its adjusted position and through such action draw the wedge block down into the groove and cause it to clamp the lagging within the groove tightly in position.

3. The combination with a pulley, having a transverse peripheral groove, lagging fitting around the pulley and against the inner walls of the groove, a wedge block fitting in the groove, a clamping strip covered with lagging arranged in the groove outward of the wedge block, a bolt extending through the said strip, wedge block and the inner wall of the groove, and means engaging the bolt and the inner wall of the groove to draw the former inward and thereby cause the covered strip to clamp upon the wedge block and the latter to clamp the lagging within the groove firmly against the walls of the latter.

4. The combination with a pulley, having a transverse peripheral groove, lagging fitting around the pulley and against the inner walls of the groove, a wedge block fitting in the groove, a clamping strip covered with lagging arranged in the groove outward of the wedge block, a bolt extending through the said strip, the covering thereof, the wedge block, the lagging within the said groove, and the inner wall of the groove, and a bolt clamping and retaining device engaging the bolt and the inner wall of the groove to cause the wedge to seat in the groove, and the covered strip to be clamped against the outer side of the wedge block and the outer portions of the lagging within the groove.

In testimony whereof, I affix my signature, in the presence of two witnesses.

WALTER W. COSBY.

Witnesses:
D. J. DOWNEY,
G. Y. THORPE.

Copies of this patent may be obtained for five cents each, by addressing the "Commissioner of Patents, Washington, D. C."